United States Patent [19]

Takahashi et al.

[11] Patent Number: 4,792,193
[45] Date of Patent: Dec. 20, 1988

[54] ANTI-SKID CONTROL SYSTEM FOR MOTOR VEHICLES

[75] Inventors: Yoshio Takahashi, Ohmiya; Hiroyuki Yoshizawa, Hasuda, both of Japan

[73] Assignee: Akebono Brake Industry Co., Ltd., Tokyo, Japan

[21] Appl. No.: 103,365

[22] Filed: Oct. 1, 1987

[30] Foreign Application Priority Data

Oct. 7, 1986 [JP] Japan .................................. 61-237232

[51] Int. Cl.$^4$ ............................................... B60T 8/78
[52] U.S. Cl. .................................... 303/100; 280/244
[58] Field of Search ............... 180/244, 245, 247, 248, 180/250; 303/100, 103, 104, 110, 111

[56] References Cited

FOREIGN PATENT DOCUMENTS

| 0071221 | 4/1983 | Japan | 180/247 |
| 2184182 | 6/1987 | United Kingdom | 303/100 |
| 2184183 | 6/1987 | United Kingdom | 303/100 |

Primary Examiner—Duane A. Reger

[57] ABSTRACT

In anti-skid control system for motor vehicles of the type that the drive system of the motor vehicle is switchable to direct-coupled 4WD system, brake pressure reduction starting points in the anti-skid control are set up to come earlier when the drive system of the motor vehicle is switched to the direct-coupled 4WD system than when said drive system is other than the direct-coupled 4WD system.

1 Claim, 5 Drawing Sheets

ANTI-SKID CONTROL SYSTEM FOR MOTOR VEHICLES

BACKGROUND OF THE INVENTION

1. Field of the Invention

This invention relates to an anti-skid control system for motor vehicles of the type that the drive system thereof is switchable to a direct-coupled four-wheel drive system (referred to as direct-coupled 4WD system hereinafter). More particularly, the invention pertains to such an anti-skid control system which is adapted, during anti-skid control operation, to cause a pressure reduction starting point to occur earlier when the drive system of the motor vehicle is switched to the direct-coupled 4WD system than when the drive system is other than the direct-coupled 4WD system, thereby making relatively small the speed difference between a high peak and a low peak of the wheel speed, and thus making it possible to achieve smooth anti-skid control operation even when the direct-coupled 4WD system is working. The expression "direct-coupled 4WD system" used herein refers to the cases where no center differential gear is provided or the cases where even if a center differential gear is provided, the differential gear is locked so that at least the drive shafts of the front and rear wheels are coupled directly to each other.

2. Description of the Prior Art

There has heretofore been proposed an anti-skid control system for motor vehicles, wherein a reference wheel speed is set up which is made to follow the wheel speed to be reduced by brake pressure buildup, with such a speed difference between the two speeds that the reference wheel speed is lower by ΔV than the wheel speed, the reference wheel speed which also is decelerated, from a point of time when the deceleration of the wheel speed reaches a predetermined level onward, with a constant deceleration gradient ($-1$ g) to hold the predetermined level of deceleration; and when the reference wheel speed becomes equal to the wheel speed, reduction of the brake pressure is started so that the wheel speed is thereby changed from deceleration to acceleration. An example of control modes which occur in such an anti-skid control system is shown in FIG. 4(A), wherein Vw indicates the wheel speed; Vt indicates the reference speed; t1, t2, ... indicate points of time when reduction of the brake pressure is started; and 100 shows the manner in which the brake pressure is increased, reduced and held. As will be seen from FIG. 4(A), the wheel speed is caused to change with a relatively great speed difference between a high peak and a low peak thereof, so that a sufficient braking force can be secured.

When the drive system of the motor vehicle is switched to the direct-coupled 4WD system, however, if the wheel speed is so greatly changed, then a difference will be caused to occur between the average speed of the front axle and that of the rear axle, so that "jerky feeling" will tend to be produced in the anti-skid control operation.

SUMMARY OF THE INVENTION

Accordingly, it is an object of the present invention to provide an anti-skid control system for motor vehicles, which is so designed that when the drive system of the motor vehicle is switched to a directcoupled 4WD system, the speed difference between a high peak and a low peak of the wheel speed is made to be relatively small so that the aforementioned problem of "jerky feeling" which would otherwise tend to occur in the anti-skid control operation, can be most effectively coped with.

Briefly stated, according to an aspect of the present invention, there is provided an anti-skid control system for motor vehicles, wherein when the drive system of the motor vehicle is switched to a direct-coupled 4WD system, the switching of the drive system is detected, and on the basis of the detection, a brake pressure reduction starting point in the anti-skid control operation is set up to come earlier than when the drive system of the motor vehicle is other than the direct-coupled 4WD system, so that reduction of the brake pressure is effected earlier, thereby making relatively small the speed difference between a high peak and a low peak of the wheel speed.

As will be appreciated, with the arrangement according to the present invention, when the drive system of the motor vehicle is switched to a direct-coupled 4WD system, reduction of the brake pressure is effected earlier so that the speed difference between a high peak and a low peak of the wheel speed is made to be relatively small. In this way, according to the present invention, when the direct-coupled 4WD system is working, it is possible to secure reliable braking operation while at the same time avoiding the aforementioned problem of "jerky feeling" and thus achieving smooth anti-skid control. Another advantage is such that the system according to the present invention can be realized in a greatly simplified construction where processing functions based on signals generated in response to the drive system of the motor vehicle being switched to the direct-coupled 4WD system, are simply added to the electronic control unit (ECU) for performing anti-skid control operation.

Other objects, features and advantages of the present invention will become apparent from the ensuing description taken in conjunction with the accompanying drawings.

DESCRIPTION OF THE PREFERRED EMBODIMENTS

Figure 1:
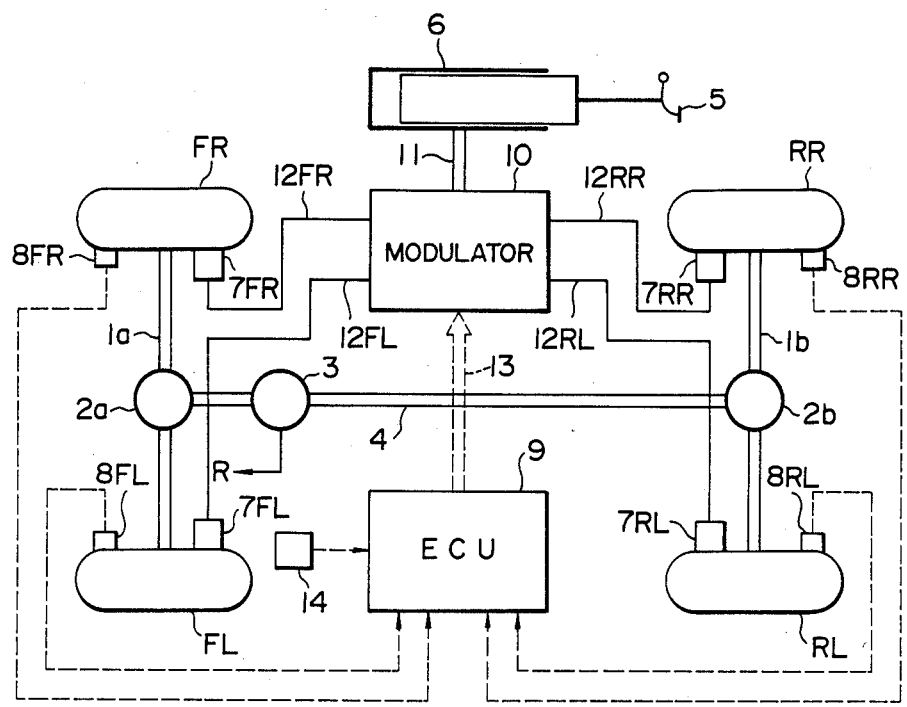
FIG. 1 is a schematic view illustrating an example of automotive brake apparatus incorporating the anti-skid control system according to an embodiment of the present invention.

Referring first to FIG. 1 of the drawings, there is illustrated an example of automotive brake apparatus incorporating the anti-skid control system according to an embodiment of the present invention, wherein a front right-hand wheel, from left-hand wheel, rear right-hand wheel and rear left-hand wheel are indicated at FR, FL, RR and RL respectively; a front axle and rear axle are indicated at 1a and 1b respectively; a front differential gear and rear differential gear are denoted at 2a and 2b respectively; and a center differential gear is shown at 3. The center differential gear 3 is coupled to a drive apparatus such as engine and so forth (not shown) through a transmission (not shown), as shown by an arrow mark R. Indicated at 4 is a propeller shaft through which the center differential gear 3 is coupled to the front and rear differential gears 2a and 2b. Each of the center, front and rear differential gears 3, 2a and 2b is adapted to be locked. Further, a brake pedal is indicated at 5; a master cylinder is indicated at 6; and brake apparatus wheel cylinders associated with the front right-hand wheel FR, front left-hand wheel FL, rear right-hand wheel RR, and rear left-hand wheel RL are denoted at 7FR, 7FL, 7RR, and 7RL respectively.

Furthermore, wheel speed detectors (speed sensors) 8FR, 8FL, 8RR and 8RL are provided in association with the front right-hand wheel FR, front left-hand wheel FL, rear right-hand wheel RR, and rear left-hand wheel RL respectively, as shown in FIG. 1. Signals derived from these speed sensors are inputted to a control circuit 9 (referred to as ECU hereinafter) which may generally be constituted by a microcomputer. According to this embodiment of the invention, the ECU 9 may comprise various elements such as contained in a broken-line block 9 in FIG. 2. Indicated at 10 is a modulator, well known in the art, which includes a gate valve, pressure buildup valve, pressure reduction valve and so forth, and adapted to control buildup/reduction of the brake fluid pressure. The modulator 10 may be constructed so as to correspond to the channel type of the brake apparatus and is connected to the master cylinder 6 through a piping 11. The number of pipes constituting the piping 11 depends on the channel type of the brake apparatus and/or the construction of the modulator. The modulator 10 is coupled to the front left-hand wheel cylinder 7FL, front right-hand wheel cylinder 7FR, rear left-hand wheel cylinder 7RL and rear right-hand wheel cylinder 7RR through pipes 12FL, 12FR, 12RL and 12RR respectively. Furthermore, the modulator 10 is adapted, during anti-skid control operation, to be controlled and enabled to perform pressure increasing, decreasing/holding operation with respect to each wheel cylinder in response to a signal provided by the ECU 9 as shown by a broken-line arrow mark 13.

According to this embodiment of the invention, means 14 is provided which is adapted, when the drive system of the motor vehicle is switched to the direct-coupled 4WD system, to detect such drive system switching and provide a signal indicating that the drive system of the motor vehicle is switched to the direct-coupled 4WD system. The direct-coupled 4WD signal generator 14 is connected to the ECU 9 and which will be described in detail hereinafter.

Figure 2:
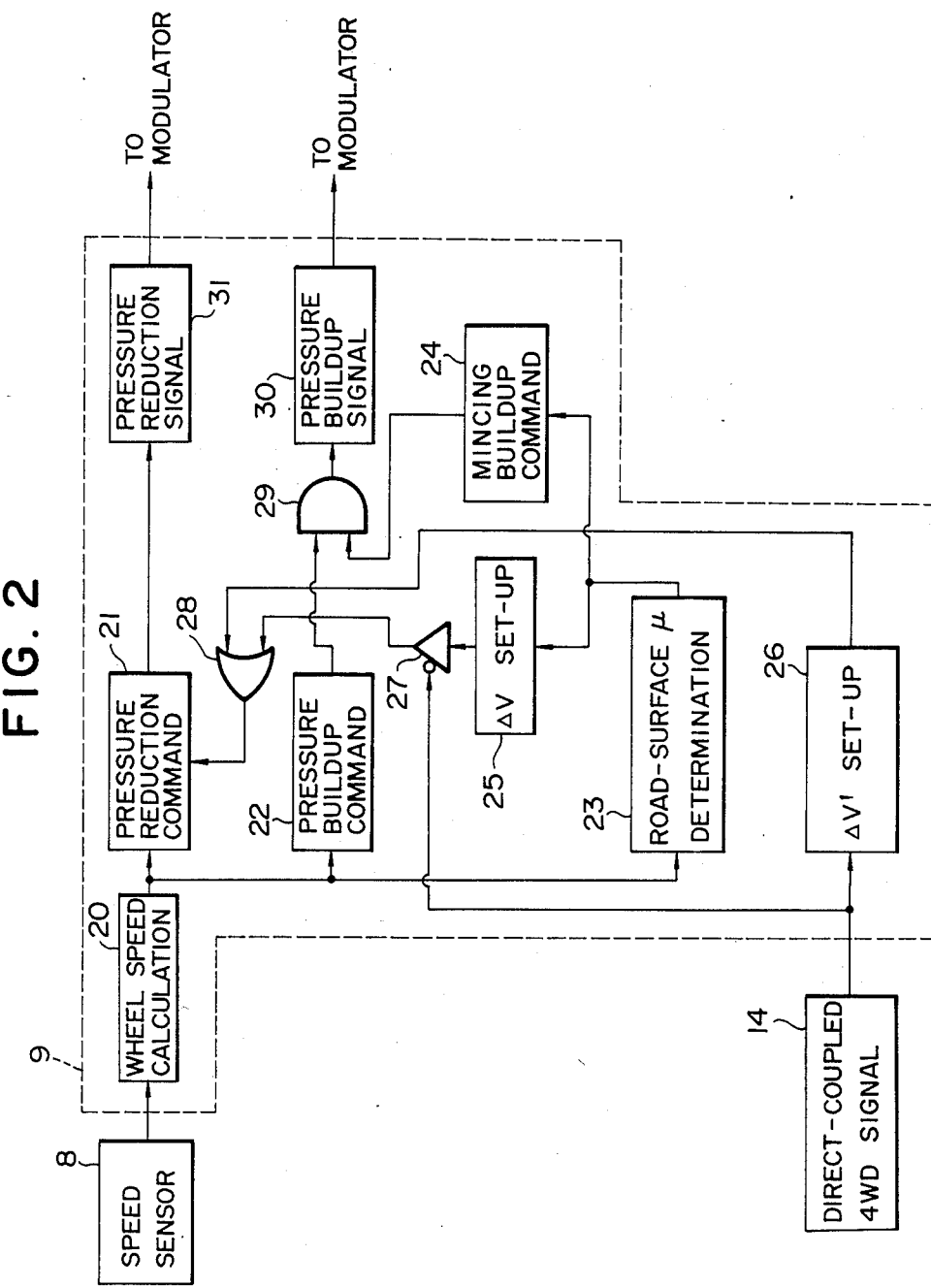
FIG. 2 is a block diagram showing an example of the circuit arrangement adapted for implementing the present invention.

Referring to FIG. 2, the aforementioned ECU 9 is shown as being surrounded by broken lines. Reference numeral 8 indicates a speed sensor, and only one such speed sensor is shown just for the sake of convenience. The ECU 9 includes a wheel speed calculation unit 20 to which the speed sensor 8 is connected; a pressure reduction command unit 21, pressure buildup command unit 22, and road-surface friction-coefficient ($\mu$) determination unit 23 which are connected to the wheel speed calculation unit 20; and a mincing pressure buildup command unit 24 and a unit 25 for setting up the speed difference $\Delta V$ between the wheel speed and the reference wheel speed when the drive system of the motor vehicle is other than the direct-coupled 4WD system. The units 24 and 25 are connected to the road-surface friction-coefficient ($\mu$) determination unit 23. According to the present invention, a unit 26 is provided for setting up a speed difference $\Delta V'$, smaller than $\Delta V$, between the wheel speed and the reference wheel speed when the drive system of the motor vehicle is switched to the direct-coupled 4WD system. The unit 26 is connected to the aforementioned 4WD signal generator 14. The ECU 9 further includes a transmission gate 27, an OR gate 28, and AND gate 29. The 4WD signal generator 14 is also connected to the negative input terminal of the transmission gate 27. The output terminal of the OR gate 28 is connected to the pressure reduction command unit 21. The unit 25 is connected to one of the input terminals of the OR gate 28 through the transmission gate 27; and the unit 26 is connected to the other input terminal of the OR gate 28. The pressure buildup command unit 22 is connected to one of the input terminals of the AND gate 29, and the mincing pressure buildup command unit 24 is connected to the other input terminal of the AND gate 29. The ECU 9 further includes a pressure buildup signal generator 30 and pressure reduction signal generator 31. The units 22 and 24 are connected to the input terminal of the signal generator 30 through the AND gate 29, and the unit 21 is connected to the input terminal of the signal generator 31. The signal generators 30 and 31 have their outputs connected to the modulator 10.

The operation of the anti-skid control system having the above-described construction according to the present invention will now be described with reference to the flow chart shown in FIG. 3. Thereafter, the operation of the arrangement shown in FIG. 2 will be explained by referring to FIG. 3.

Figure 3:
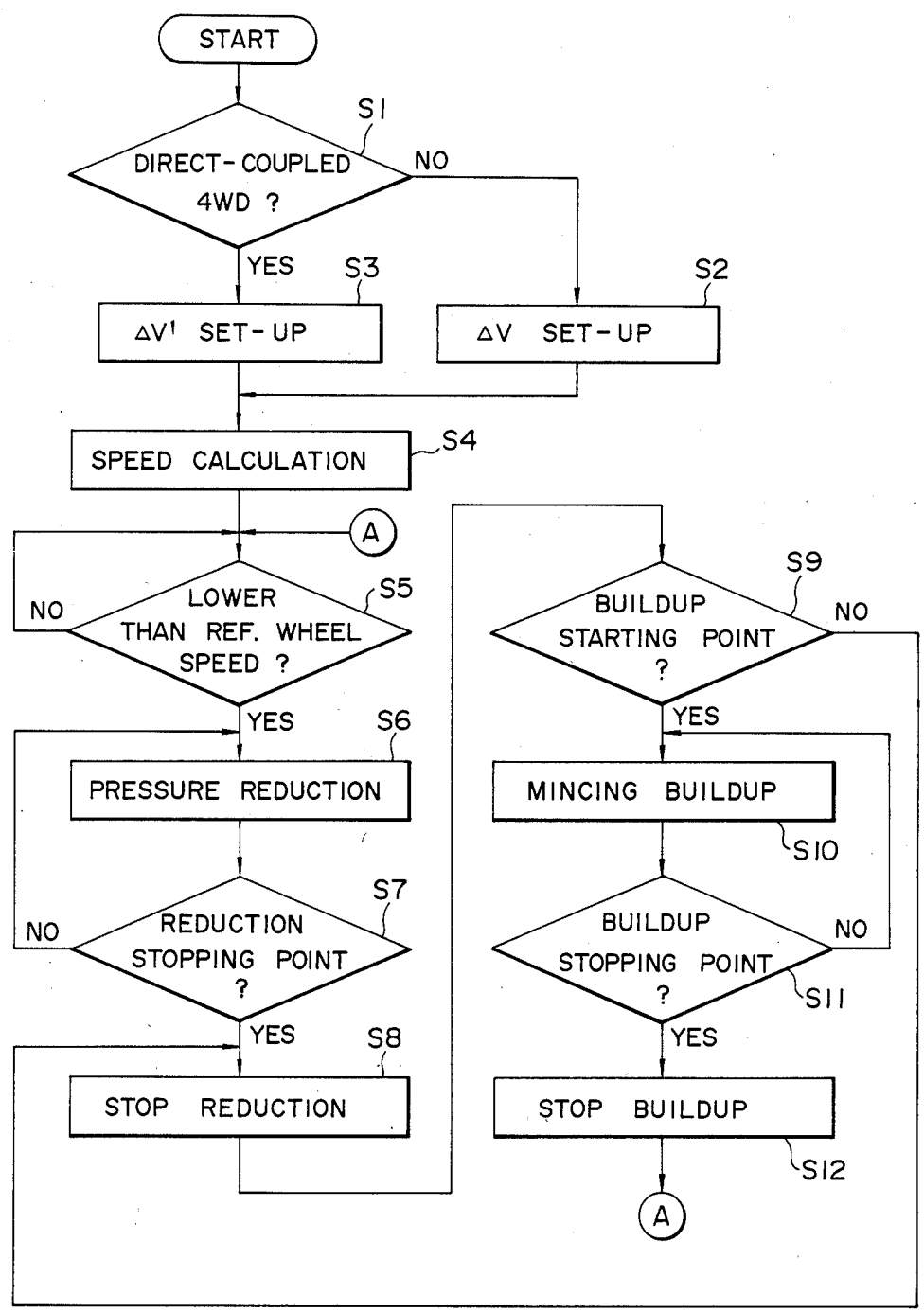
FIG. 3 is a flow chart useful for explaining the operation of the anti-skid control system according to the present invention.
Figure 4A:
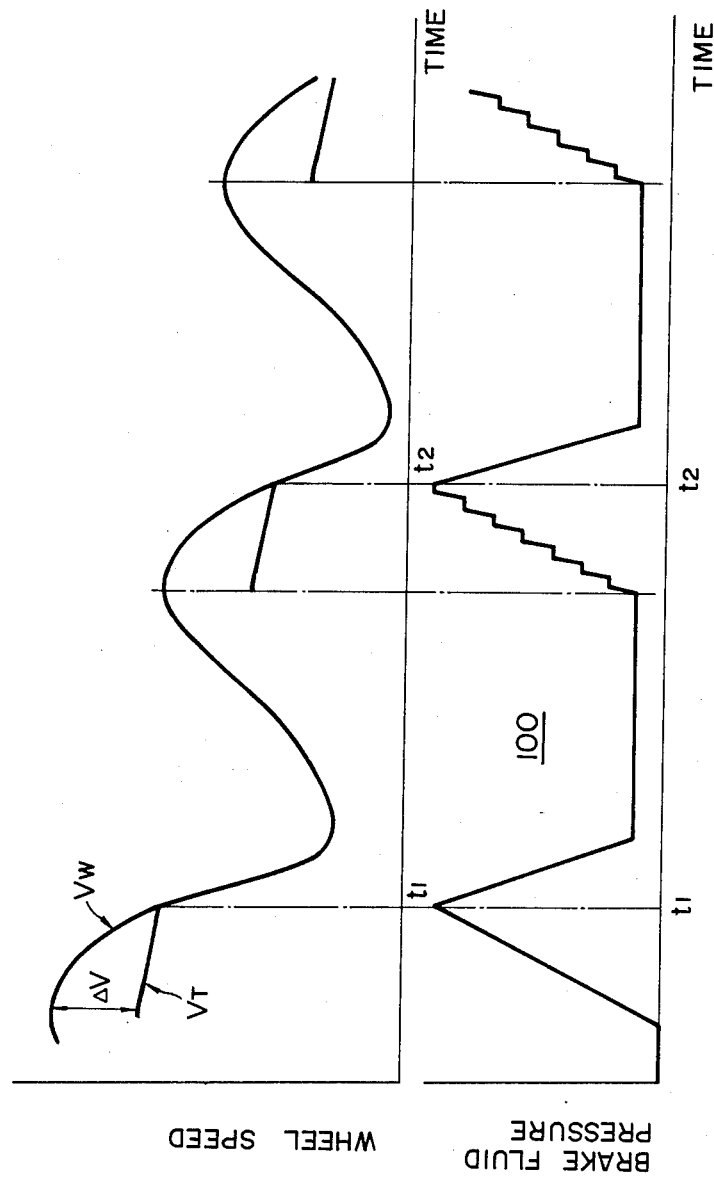
FIGS. 4a and 4b are views useful for explaining control modes which occur in the anti-skid control system of the present invention.

As shown in the flow chart of FIG. 3, at step S1, judgment is made as to whether or not the drive system of the motor vehicle is switched to the direct-coupled 4WD system. This judgment is effected based on whether or not a signal is provided by the direct-coupled 4WD signal generator 14. If the result of the judgment at the step S1 is "NO", i.e., in case the drive system of the motor vehicle is not changed to the direct-coupled 4WD system, the process advances to step S2, wherein the speed difference $\Delta V$ between the wheel speed Vw and the reference wheel speed Vt is set up as described above with reference to FIG. 4(A). The initial pressure buildup in the curve 100 representing variations in the brake fluid pressure in FIG. 4(A) is caused by depression of the brake pedal 5, and the second and succeeding pressure buildup results from the anti-skid control operation. The second and succeeding pressure buildup is effected step-wise, i.e., mincingly so that the brake fluid pressure is caused to relatively gradually build up, and this is done for the purpose of achieving reliable anti-skid control operation. This is also true of the case shown in FIG. 4(B), but further explanation thereof will be omitted since this is not directly related to the gist of the present invention. The operation which will be described below is started with pressure reduction subsequent to the initial pressure buildup produced by depression of the brake pedal, and is repetitively performed in the order of pressure holding, gradual pressure buildup and subsequent pressure reduction.

Figure 4B:
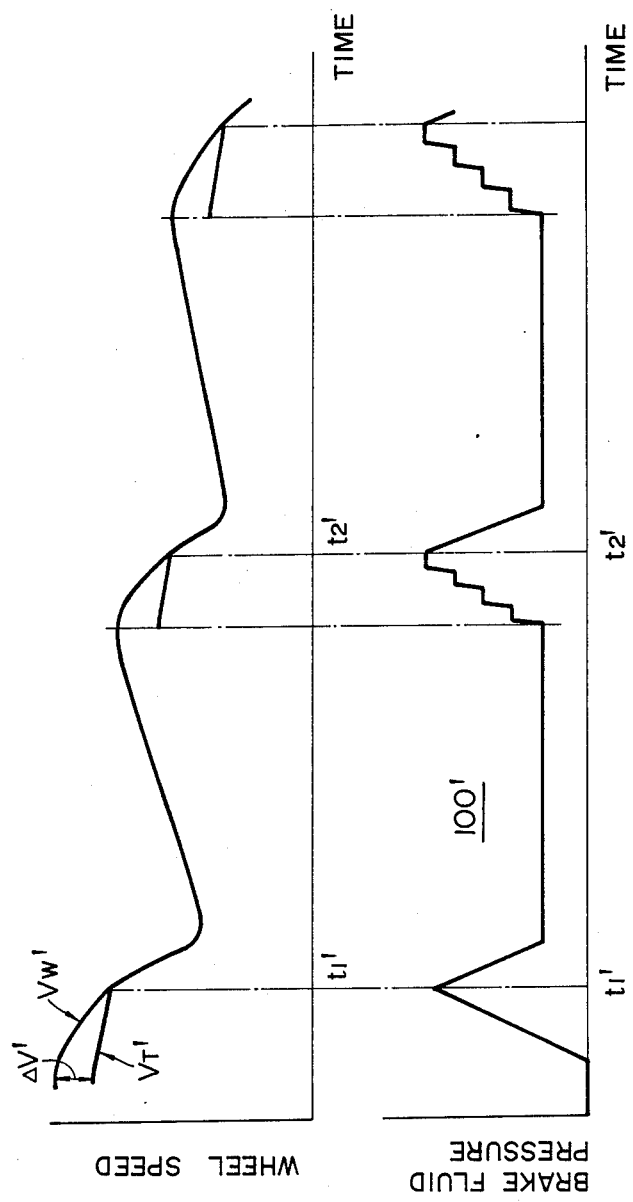

After the speed difference $\nabla V$ is set up at the step S2, the process advances to step S4, and the wheel speed is calculated on the basis of a signal derived from the speed sensor 8 as will be described later with reference to FIG. 2. Subsequently, the process advances to step S5 where judgment is made as to whether or not the wheel speed has become lower than the reference wheel speed. If the result of the judgment at the step S5 is "NO", the judging operation is repeated, while if the result of the judgment is "YES", reduction of the brake fluid pressure is started at step S6. Consequently, the wheel speed is increased. At step S7, judgment is made as to whether the wheel speed has reached a pressure reduction stopping point. If the result of the judgment is "NO", the step S7 is repeated, while if the result is "YES", the process advances to step S8 where the pressure reduction is ceased. In such a state, the process advances to steps S9, and judgment is made as to whether the wheel speed has reached a pressure buildup starting point. If the result of the judgment is "NO", the process returns to the step S8, while if the result is "YES", the brake fluid pressure is increased step-wise, i.e., mincingly at step S10 as shown in FIGS. 4(A) and 4(B). As a result, the wheel speed is decreased, and at step S11, judgment is made as to whether or not the wheel speed has been decreased down to a pressure buildup stopping point. If the result of the judgment is "NO", the process returns to the step S10, while if the result is "YES", the pressure buildup is stopped at step S12. In this case, the above-mentioned operation is repeated as indicated by A.

If the result of the judgment at the step S1 is "YES", i.e., in case the drive system of the motor vehicle is switched to the direct-coupled 4WD system, a speed difference $\Delta V'$, which is smaller than $\Delta V$, is simply set up between the wheel speed and the reference wheel speed, and the steps S4 to S12 are carried out in the same manner as in the above-described case. In this case, as shown at 100' in FIG. 4(B), reduction of the brake fluid pressure is effected at earlier points t1', t2', . . . as compared with the case where the drive system of the motor vehicle is other than the direct-coupled 4WD system, i.e., the case of FIG. 4(A). Thus, as shown at Vw' in FIG. 4(B), the wheel speed is changed so that the difference between a high peak and a low peak thereof turns out to be smaller, thereby avoiding the problem of "jerky feeling".

Although it is believed that the operation of the arrangement shown in FIG. 2 has been fully understood from the foregoing discussion, such operation will again be briefly explained with reference to the various steps of the flow chart shown in FIG. 3 to give a better understanding of it. When the drive system of the motor vehicle is not switched to the direct-coupled 4WD system, i.e., when the drive system is other than the direct-coupled 4WD system, no signal is derived from the signal generator 14 (the result of the judgment at the step S1 is "NO") so that the value $\Delta V$ provided by the unit 25 is set up at the pressure reduction command unit 21 (step S2). In such a state, the wheel speed is calculated in the wheel speed calculation unit 20 on the basis of signal derived from the speed sensor 8 (step S4); and the wheel speed is compared with the reference wheel speed in the pressure reduction command unit 21 so that it is judged whether or not the wheel speed has become lower than the reference wheel speed (step S5). If the wheel speed has become lower than the reference wheel speed, an output signal derived from the pressure reduction command unit 21 is applied to the pressure reduction signal generator 31 the output of which in turn is applied to the modulator 10 so that reduction of the brake fluid pressure is thereby started (step S6). Under such a condition, the aforementioned judgment at the step S7 is made in the pressure reduction command unit 21, and when the wheel speed reaches the pressure reduction stopping point, the output signal from the pressure reduction command unit 21 is no longer available, and thus the output signal from the pressure reduction signal unit 31 is also no longer available, so that the modulator 10 is made to stop the reduction of the brake fluid pressure (step S8).

In such a state, the aforementioned judgment at the step S9 is made in the mincing pressure buildup command unit 24. If the result of the judgment is "YES", the outputs of the pressure buildup command unit 22 and mincing pressure buildup command unit 24 are provided to the pressure buildup signal generator 30 through the AND gate 29; and on the basis of the output signal of the unit 30, the modulator 10 is permitted to produce such stepped or mincing pressure buildup as shown in FIGS. 4(A) and 4(B) (step S10). In such a state, the aforementioned judgment at the step S11 is made at the pressure buildup command unit 22. If the result of the judgment is "YES", the output signal from the pressure buildup signal generator 30 becomes unavailable so that the pressure buildup is stopped (step S12).

When the drive system of the motor vehicle is switched to the direct-coupled 4WD system, a signal is derived from the signal generator 14 (the result of the judgment at the step S1 is "YES") so that the transmission gate 27 is turned off and thus the aforementioned value $\Delta V'$ at the unit 26 is established at the pressure reduction command unit 21. As mentioned above with reference to FIG. 4(B), according to the present invention, reduction of the brake fluid pressure is effected earlier so that the speed difference between a high peak and a low peak of the wheel speed is made to be relatively small, thus resulting in such effects as mentioned in the preamble portion of the specification.

While the invention has been illustrated and described with respect to some specific embodiments thereof, it is to be understood that the invention is by no means limited thereto but covers all changes and modifications which will become possible within the scope of the appended claims.

We claim:

1. An anti-skid control system for a motor vehicle having a direct-coupled 4WD system and a drive system other than a direct-coupled 4WD system; comprising:

means for switching said drive system from said direct-coupled 4WD system to the drive system other than a direct-coupled 4WD system, and vice versa;

first means for detecting whether the drive system of the motor vehicle is switched to the direct-coupled 4WD system; and second means adapted, when the first means has detected that the drive system is switched to the direct-coupled 4WD system for setting up brake pressure reduction starting points in the anti-skid control system to come earlier than when the drive system is switched to that other than the direct-coupled 4WD system; said second means comprising:

means for calculating a wheel speed;

means for setting up a reference wheel speed on the basis of said wheel speed in such a manner as to follow said wheel speed with a predetermined speed difference therebetween and to vary with a predetermined constant gradient of deceleration when a deceleration of said wheel speed goes beyond a predetermined level; and means for setting up said predetermined speed difference smaller when the drive system of the motor vehicle is switched to the direct-coupled 4WD system than when said drive system is switched to that other than the direct-coupled 4WD system.

* * * * *